(12) United States Patent
Ferrari et al.

(10) Patent No.: US 12,387,758 B2
(45) Date of Patent: Aug. 12, 2025

(54) METHOD OF OPERATING HARD DISK DRIVES, CORRESPONDING HARD DISK DRIVE AND PROCESSING DEVICE

(71) Applicants: STMicroelectronics KK, Tokyo (JP); STMicroelectronics S.r.l., Agrate Brianza (IT)

(72) Inventors: Marco Ferrari, Voghera (IT); Davide Betta, Barzano (IT); Diego Tognoli, Tokyo (JP); Roberto Trabattoni, Corbetta (IT)

(73) Assignees: STMicroelectronics S.r.l., Agrate Brianza (IT); STMicroelectronics. KK, Tokyo (JP)

( * ) Notice: Subject to any disclaimer, the term of this patent is extended or adjusted under 35 U.S.C. 154(b) by 0 days.

(21) Appl. No.: 18/597,484

(22) Filed: Mar. 6, 2024

(65) Prior Publication Data

US 2024/0212714 A1 Jun. 27, 2024

Related U.S. Application Data

(63) Continuation of application No. 18/166,291, filed on Feb. 8, 2023, now Pat. No. 11,942,113.

(30) Foreign Application Priority Data

Feb. 21, 2022 (IT) .......................... 102022000003119

(51) Int. Cl.
*G11B 5/54* (2006.01)
*G11B 21/08* (2006.01)

(52) U.S. Cl.
CPC .................. *G11B 21/083* (2013.01)

(58) Field of Classification Search
CPC ... G11B 21/0083; G11B 5/5556; G11B 5/488; G11B 5/4813; G11B 5/5565; G11B 5/5573; G11B 5/54; G11B 5/5547; G11B 5/59605; G11B 19/04
USPC ......................................................... 360/75
See application file for complete search history.

(56) References Cited

U.S. PATENT DOCUMENTS 9,940,958 B1   4/2018 Kiyonaga et al.
10,152,994 B1* 12/2018 Capretta ............ G11B 5/59694

OTHER PUBLICATIONS

Linustechtips, "(edit:CES) Two arms are better than one—Seagate Release dual actuator HDD for Microsoft", https://linustechtips.com/topic/1131398-edit-ces-two-arms-are-better-than-one-seagate-release-dual-actuator-hdd-for-microsoft/, Dec. 5, 2019, 17 pages.
Seagate, "Seagate 7200.14 3.5inch 2TB 64MB 7200rpm SATA6.0Gb/s ST200DM001", Amazon JP, https://www.amazon.co.jp/SEAGATE-7200-14-3-5inch-SATA6-0Gb-ST2000DM001/dp/B005T3GRN2, Nov. 8, 2011, 7 pages.

* cited by examiner

*Primary Examiner* — Nabil Z Hindi
(74) *Attorney, Agent, or Firm* — Slater Matsil, LLP

(57) ABSTRACT

In accordance with an embodiment, a hard disk drive includes voice coil motors (VCMs) coupled to respective control units configured to drive retract an operation of the VCMs in the hard disk drive. The retract operation of the VCMs includes a sequence of retract steps. The control units are allotted respective time slots for communication over a communication line with the respective time slots synchronized via the common clock line, and are configured to drive sequences of retract steps of the VCMs in the hard disk drive in a timed relationship.

20 Claims, 7 Drawing Sheets

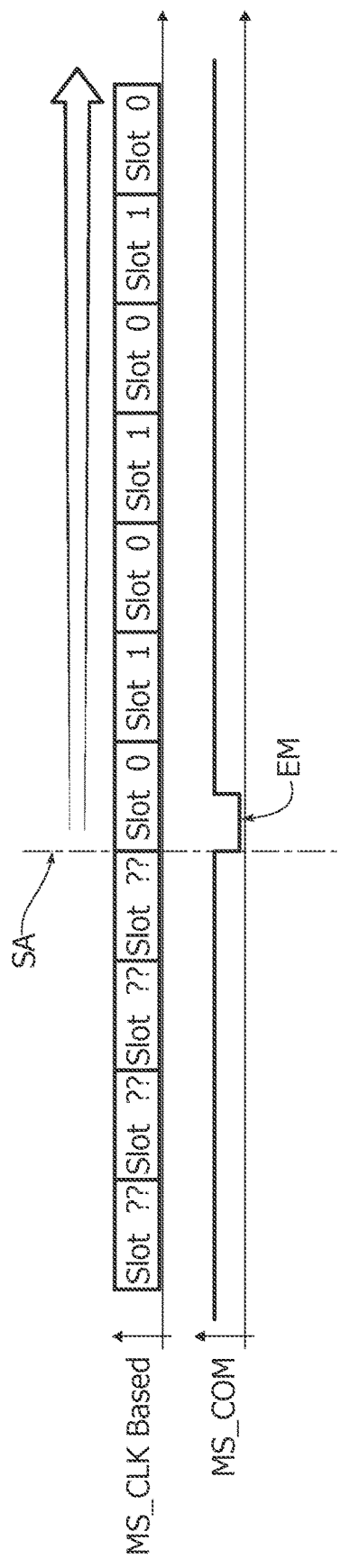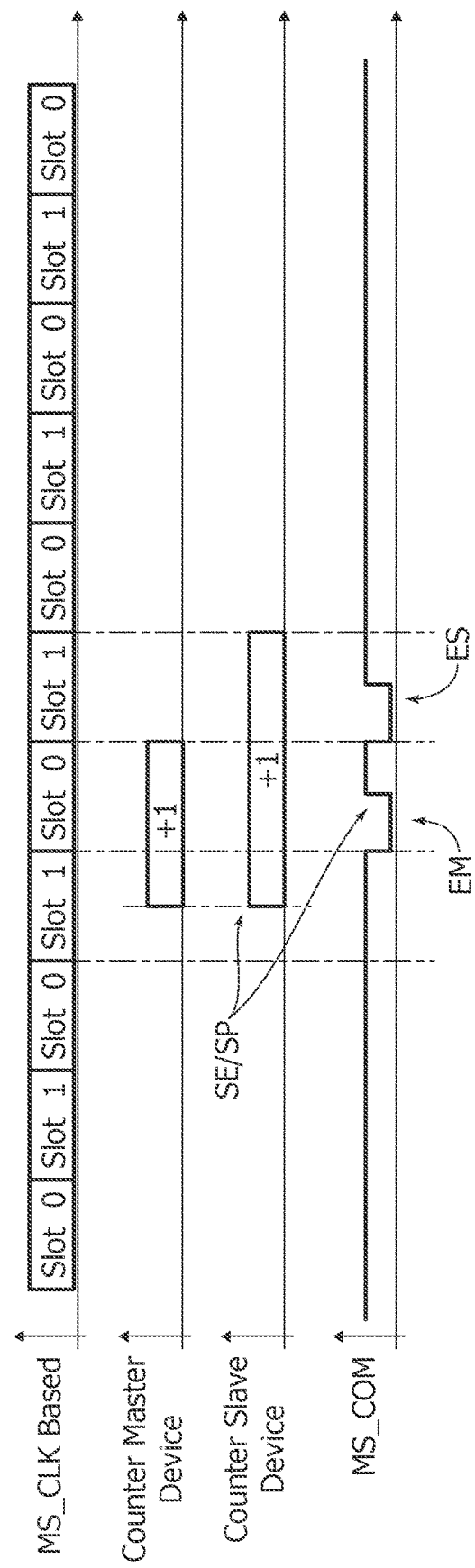

METHOD OF OPERATING HARD DISK DRIVES, CORRESPONDING HARD DISK DRIVE AND PROCESSING DEVICE

CROSS-REFERENCE TO RELATED APPLICATIONS

This application is a continuation of U.S. patent application Ser. No. 18/166,291, filed Feb. 8, 2023, which application claims the benefit of Italian Patent Application No. 102022000003119, filed on Feb. 21, 2022, which applications are hereby incorporated herein by reference.

TECHNICAL FIELD

The description relates to electronic devices, and more particularly to a method of operating hard disk drives, a corresponding hard disk drive, and a processing device.

BACKGROUND

A voice coil motor or VCM is a linear motor used to move the heads in a hard disk drive (HDD). Including plural voice coil motors (VCMs) and heads may be used to increase the data rate in the HDD. Such an approach involves the ability for an HDD system to manage and control more than one VCM at a time.

Managing plural VCMs during normal operation (write/read during "power good" times) can be accomplished via an associated System on Chip (SoC). Controlling the plural VCMs during retract operation (emergency retract as well as power good retract) may turn out to be more complex in view of the desirability of completing the retract operation without damaging the heads of the HDD and/or without interrupting emergency data saving during power down.

SUMMARY

One or more embodiments relate to a corresponding hard disk drive. One or more embodiments relate to a corresponding processing device. A computer, a server, or data center equipped with a hard disk drive are exemplary of such a device.

In certain examples as discussed herein, plural integrated circuits (ICs) are interconnected to provide synchronization of a head retract procedure involving plural VCMs in an HDD. For instance, the ICs can be connected between two lines, a clock line and a communication line. One unit in the resulting system is assigned master status, e.g., to provide an internal clock signal for the other devices in the system, and the other devices act as slave units, configured to receive an internal clock signal from the master unit. The various devices can be configured to communicate via the communication line at dedicated time slots. The master or slave status and an associated time slot can be assigned at system startup by a specific setting of an internal register of the device.

Such an arrangement offers one or more of the following advantages: retract operation of plural VCMs can be synchronized using only two device pins; connection via a communication line on a dedicated slot facilitates avoiding bus contentions; the device may be made largely independent of the associated System on Chip (SoC): and the SoC can be turned off to save power. In certain examples as discussed herein, plural VCMs can be synchronized with a same clock signal with retract steps started autonomously without relying on system firmware (FW).

BRIEF DESCRIPTION OF THE DRAWINGS

One or more embodiments will now be described, by way of example only, with reference to the annexed figures, wherein:

FIG. 4 is illustrative of master slot synchronization in a system as discussed herein;

FIG. 5 is illustrative of the possibility of non-overlapped operation in a system as discussed herein;

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

Also, for the sake of simplicity and ease of explanation a same designation may be applied throughout this description to designate a circuit node or line (e.g., MS_CLK, MS_COM) as well as a signal occurring at that node or line.

DETAILED DESCRIPTION OF ILLUSTRATIVE EMBODIMENTS

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like, that may be present in various points of the present description do not necessarily refer exactly to the same embodiment. Further-more, particular configurations, structures, or characteristics may be combined in any adequate way in one or more embodiments.

The headings/references used herein are provided merely for convenience and hence do not define the extent of protection or the scope of the embodiments.

As discussed in the introductory portion of this description, HDD is an acronym for Hard Disc Drive. In addition, the designation voice coil motor or VCM is used to designate linear motors used to move the heads in hard disk drives.

A hard disk drive is a basic component of various types of processing devices such as personal computers, servers, data centers or the like and is the physical location where information is stored.

Figure 1:
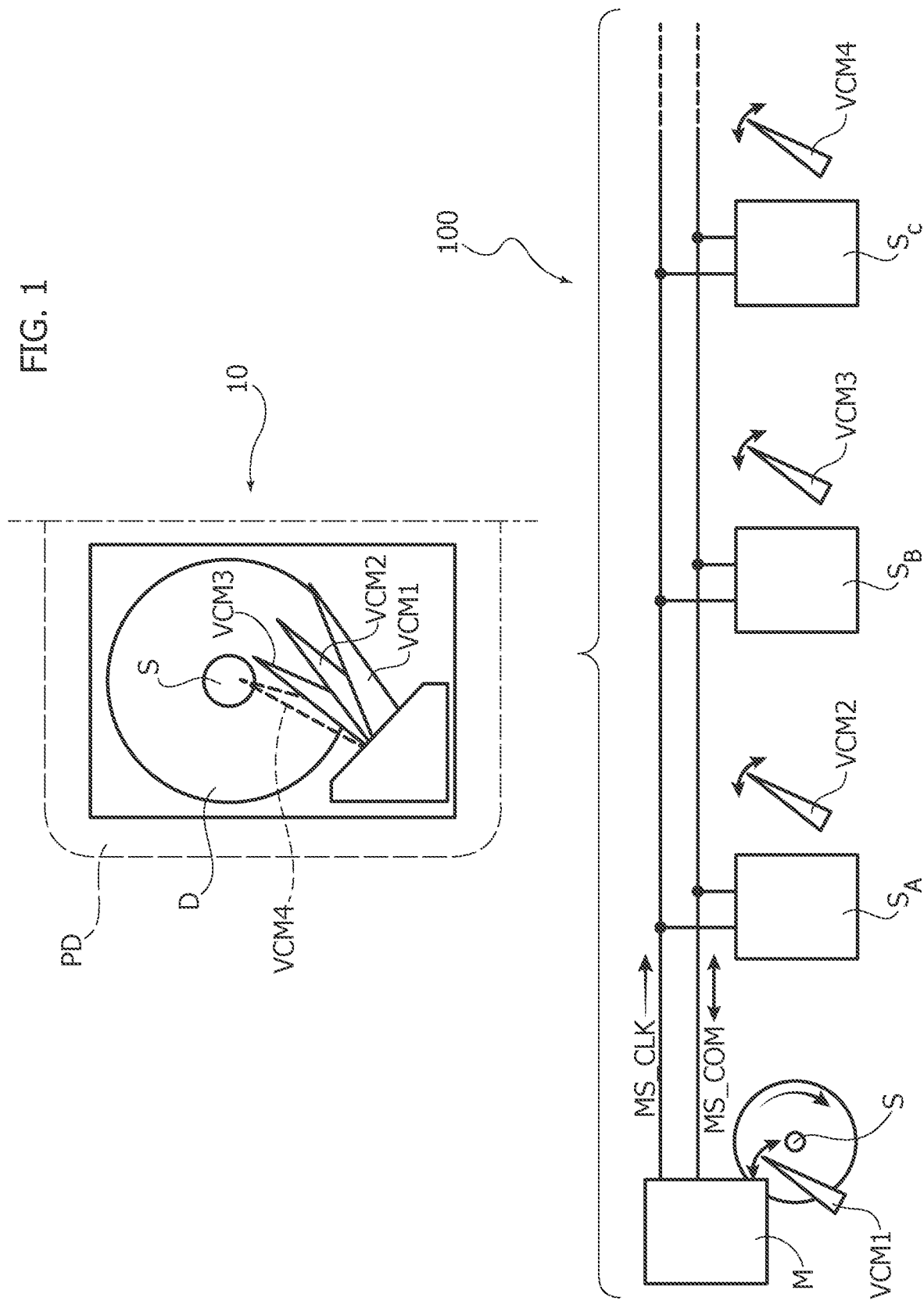
FIG. 1 is illustrative of a hard disk drive (HDD) including a multi-VCM synchronization system as discussed herein.

A multi-VCM hard disk drive 10 in a processing device PD as illustrated in FIG. 1 comprises a storage medium in the form of one or more magnetic disks (e.g., a stack of disks collectively designated D) used to store the information in a magnetic form and driven in rotation by a motor, currently referred to as "spindle" motor S. Read/write heads mounted on pivoted arms driven by voice coil motors or VCMs (e.g., VCM1, VCM2, VCM3, VCM4, . . . ) are used to write/read the information on/from the storage medium D.

The general structure and operation of an HDD (at least in a single-VCM configuration) are well known in the art, which makes it unnecessary to provide a more detailed description herein.

Retract operation (or "retract", as the action of VCM parking is briefly referred to in the art) is a fairly complex procedure that includes several steps.

Emergency retract in a conventional single-VCM system can be managed by an integrated circuit (IC) currently referred to as the motor controller IC (or controlling device, or controlling IC), that is with one VCM controlled by a single device.

Introducing multiple VCMs facilitates increasing the data rate of an HDD. This is advantageous insofar as the plural VCMs can be adequately controlled at the same time, thus coordinating operation of several VCMs.

As noted, managing plural VCMs during normal operation (write/read during "power good" times) can be accomplished via an associated System on Chip (SoC).

Controlling plural VCMs during retract (emergency retract as well as power good retract) may turn out to be a complex task in view of the desirability of completing retract without head damage and/or without interrupting emergency data saving during power down.

At least in principle, a firmware-based solution, controlled entirely by a microprocessor (e.g., a system-on-chip or SoC), can be used for that purpose.

Such a solution is likely to be limited by its "uniqueness", that is, the need of specializing the solution as a function of the requirements of a particular HDD type or HDD manufacturer (hereinafter referred to as the "user"), thus making such a firmware-related solution essentially proprietary.

Also, a firmware-based solution may suffer from lack of synchronization of steps that are completely managed by the controlling device (that is, with beginning and start of these steps not directly communicated to the SoC) as well from lack of synchronization of clock signals that provide the timing of the retract steps in the devices that control the (plural) VCMs.

Another possible drawback of firmware-based solutions lies in that, in the case of SoC misbehavior (not necessarily a hardware fail: even a stack overflow or a non-recoverable firmware error may be of concern) the system will fail the retract procedure.

In accordance with an embodiment, a hard disk drive for a processing device such as a computer, server or data center includes plural voice coil motors (VCMs) coupled to respective control units are configured to drive retract operation of the plural VCMs in the hard disk drive. Retract operation of the VCMs includes a sequence of retract steps. One of the control units is configured to be assigned master status and to apply a clock signal to a common clock line. The other control units are configured to be assigned slave status so that the control units coupled via the common clock line are all clocked by the clock signal applied by the master unit. The control units are allotted respective time slots for communication over a communication line with the respective time slots synchronized by the clock signal applied to the common clock line. The control units are configured to drive sequences of retract steps of the plural VCMs in the hard disk drive in a timed relationship admitting both time-overlapped and time-non-overlapped retract steps.

Examples as presented herein facilitate adequately controlling/synchronizing retract operation of plural VCMs both in "power fail" and in "power good" conditions, facilitating control of retract operation by a controlling device (that is without assistance by a SoC needed by way of necessity).

Examples as presented herein provide a protocol and synchronization system to manage retract operation of plural VCMs (the pivoted arm and write/read head carried thereby) in order to facilitate "parking" in response to the spindle motor being slowed down and eventually stopped.

The bottom part of FIG. 1 is illustrative of master and slave functionalities, collectively designated 100, in a synchronization system for a multi-VCM hard disk drive (HDD) 10 as discussed herein.

In the example considered herein, the system comprises four control units including: a first unit M that is assigned master status and controls the spindle motor S and a first VCM, designated VCM1; and three further units SA, SB, and Sc that are assigned slave status and control three further VCMs, designated VCM2, VCM3 and VCM4. This amounts to a total of one spindle motor S and four VCMs, VCM1 to VCM4 controlled in the HDD 10.

The three slave units SA, SB, and Sc are coupled to a clock line MS_CLK and a communication line MS_COM from the master unit M.

The representation of FIG. 1 is of course merely exemplary in that the HDD 10 may comprise any number of "further" VCMs (and slave units).

As further discussed in the following, after each one of the retract stages, the device executing that stage can generate a pulsed signal on the MS_COM line.

As further discussed in the following, in a system/protocol as exemplified herein, each retract stage can be either executed immediately or wait for a specific desired time (this may be set by the user in view of the prospected use/application). The specific time can be determined via a counter associated to the number of pulses counted on the MS_COM line.

The wait time on the device can be implemented with a Low ON Brake action (turn on of the Low Side of the VCM Full H Bridge): this kind of operation (currently referred to as "Low-On") and the associated vocabulary are well known to those of skill in the art from single-VCM HDDs, which makes it unnecessary to provide a more detailed description herein.

To avoid unexpected long waiting times or communication issues, each device (here, VCM1 to VCM4) can have a dedicated time out to avoid unlimited waiting times. Also, an internal clock can be made available for each of the devices to facilitate recovery even if the clock signal MS_CLK is lost.

A system 100 as illustrated in FIG. 1 can be configured to implement a multi-VCM synchronization protocol capable of performing and synchronizing safe retract operation in a multi-VCM hard disk drive in different conditions such as, for instance, power good, power down or firmware control lost by the SoC.

As noted, a multi-VCM system can be designed providing a respective controller IC for each VCM (in the exemplary case considered here, VCM 1 to VCM 4, but the system can notionally include any number of VCMs).

In examples as considered herein one of the ICs (acting as master device M) controls both the spindle motor S and a first VCM, namely VCM1, while the other ICs (slave devices SA, SB, Sc, . . . ) control the other VCMs, namely VCM2 to VCMn (here, by way of example, n=4): thus (only) one master IC and one or more slave ICs.

The master IC, namely M, and each of the slave ICs, (in the example considered here, SA, SB, and Sc) can perform different tasks and functionalities. In a multi-VCM synchronization protocol considered herein, two such tasks/functions come to the foreground.

A first task/function is motor spinning and back-electromotive force (BEMF) rectification. These functions spin the motor S and provide rectification of the BEMF therefrom in case of power down to generate electrical energy (voltage) to sustain the retract process when input power is no longer available from other sources.

In a system 100, as exemplified herein, these functions are managed by a single device, namely the master unit M.

A second task/function is VCM driving and parking. These functions control the VCM position (when active, e.g., writing, on the storage disks) and retract operation when the HDD is actuated to park the VCMs in their garage.

In a system 100, as exemplified herein, these functions are managed by all the devices, namely the master M and the slaves (in the example considered here, SA, SB, and Sc).

Figure 2:
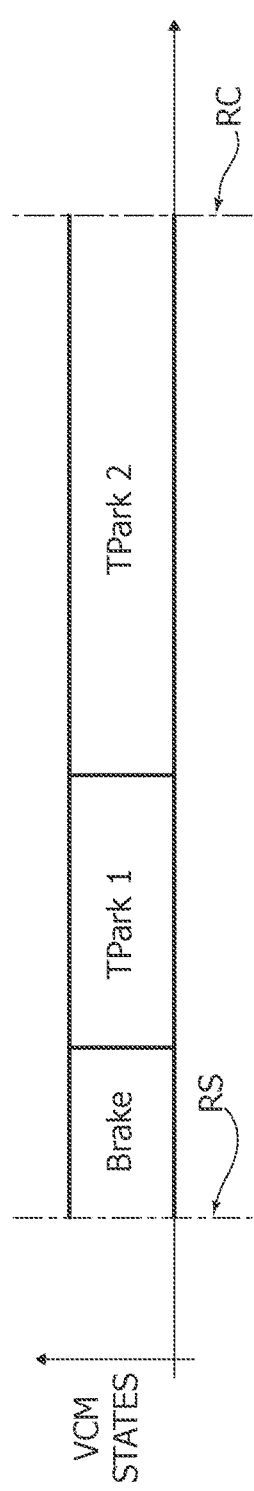
FIG. 2 is illustrative of retract steps of a single VCM in a system as discussed herein.

As illustrated in FIG. 2, retract of each individual VCM—which is started at a time designated RS and completed at a time designated RC—can be regarded as including three different steps or phases (VCM STATES) in the following order (it is otherwise noted that all the retract states can be customized by the user in a manner known per se to those of skill in the art): a brake phase (VCM braking action); a first park phase TPark 1: a constant voltage/constant velocity park phase; and a second park phase Tpark 2: typically a constant voltage phase.

While new/additional phases can be accommodated in a system as discussed herein, these three phases (the most commonly used in the art) are considered for simplicity and ease of understanding. These steps/phases will be assumed to be performed (always) in the same order, namely: Brake, TPark 1 and TPark 2.

Each one of these steps/phases has a power impact on a short time. Considering that in power down conditions, the BEMF from the spindle motor S is sustaining the supply voltage, adequately timing these steps based on a desired timed relationship is advantageous.

In the case of a single VCM, these steps are executed and timed autonomously by a single unit (e.g., like the one acting as the master unit M in the examples considered herein) without any extra synchronization involved.

In the multi-VCM examples considered here, synchronization is provided with the possibility of countering any undesired overlap of these steps, which may create power down issues.

Figure 3:
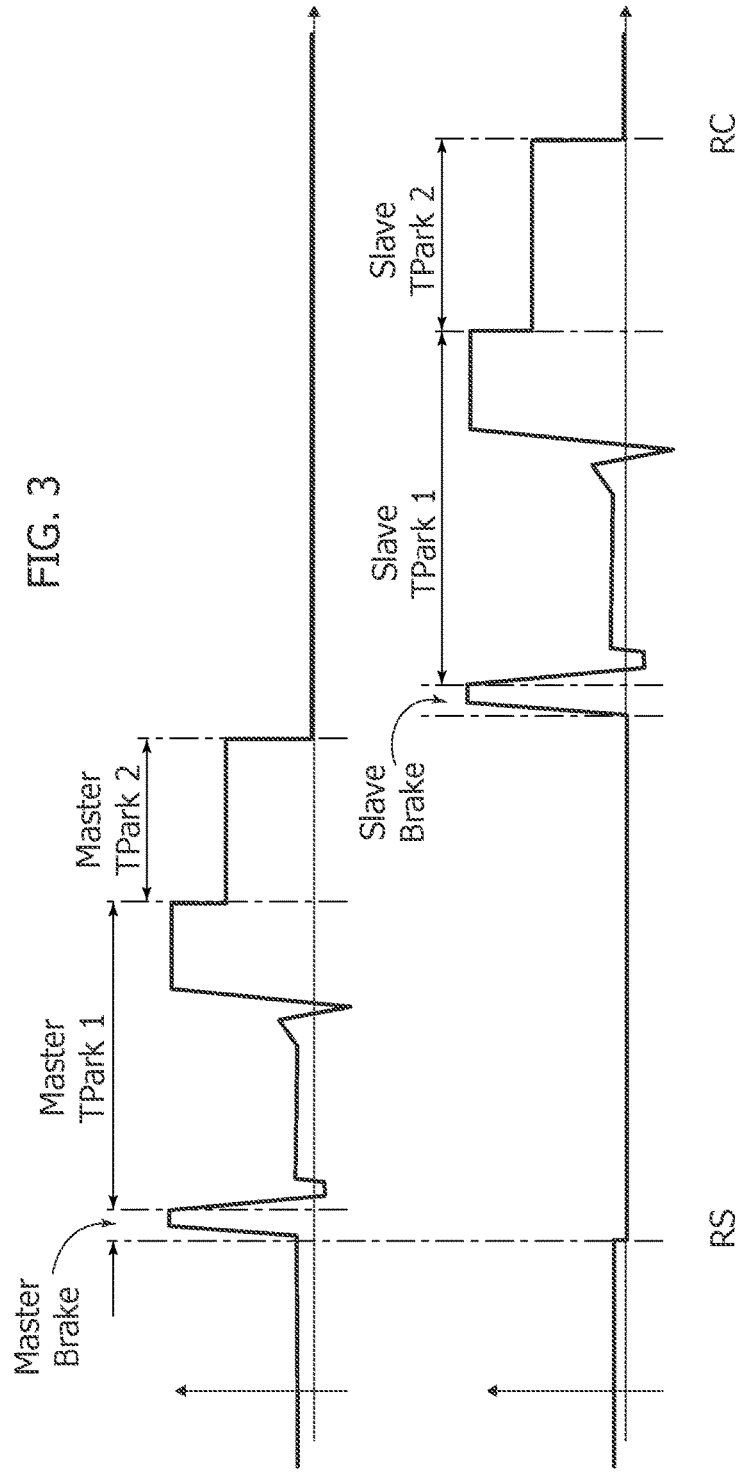
FIG. 3 is illustrative of a possible time behavior and intensity of VCM retract currents in a hard disk drive.

FIG. 3 represents by way of example the possible time behavior of the current through a "master" VCM such as VCM1 in FIG. 1 (labeled Master Brake, Master TPark 1 and Master TPark 2 in FIG. 3) and through any of the "slave" VCMs in FIG. 1 (labeled Slave Brake, Slave TPark 1 and Slave TPark 2 in FIG. 3) during respective Brake, TPark 1 and TPark 2 phases.

The diagrams in FIG. 3 show that VCM currents can reach very high levels at different times of the retract process.

In examples as presented herein (see FIG. 1, for instance) the various ICs, namely M, SA, SB, and Sc are interconnected via the lines MS_CLK and MC_COM and the retract procedures of the individual ICs are synchronized. This facilitates achieving a high flexibility in managing the various combinations of (e.g., emergency) VCM retract procedures likely to occur in the case of a "global" multi-VCM retract procedure started at instant RS and completed at instant RC.

The solution presented herein has a reduced impact on the HDD support substrate (a printed circuit board-PCB, for instance), e.g., as regards the number of lines involved in interconnecting the various devices therein. Also, the solution presented herein has a reduced impact on the semiconductor area used for hosting the system. Additionally, the solution presented herein is safe in case of miscommunication, with the various ICs involved in a retract operation synchronized to a same internal clock signal.

As collectively indicated by 100 in the lower part of FIG. 1, the various ICs in the system are connected via the two lines MS_CLK (clock) and MS_COM (communication). The line MS_CLK carries a clock signal shared between the various devices M, SA, SB, Sc in the system 100. As exemplified herein, the line MS_CLK acts as a unidirectional line: the master unit generates—in a manner known per se to those of skill in the art—a (master) clock signal and the slave units SA, SB, and Sc receive that signal over the line MS_CLK and are thus all clocked in a synchronized manner by that clock signal. The line designated MS_COM can be implemented, e.g., as an open drain line that carries information system-wide across all the devices in the system. The line designated MS_COM facilitates co-coordinating (synchronizing) the VCM states, highlighting the start and the end of each retract stage. The line designated MS_COM can be designed to operate according to a time-domain division (TDM) scheme where each of the devices "belongs" to (is allotted) a specific time slot. This facilitates avoiding undesired contention and miscommunication.

In a possible implementation, one device (here the device M) on the PCB is assigned a master role with the main task of providing an internal clock signal over the line MS_CLK and rectifying the BEMF of the spindle motor S for energizing retract operation of the (other) devices in the system 100, e.g., in case of power down retract operation.

A principle underlying the multi-VCM synchronization protocol implemented in a system such as the system 100 is that each device in the system follows a specific sequence of retract stages: in order Brake, TPark 1 (T1 or TPark 1) and TPark 2 (T2 or TPark 2).

As discussed previously, the retract stages can be executed either immediately or waiting for a specific time.

The value for the specific time can be determined via a counter associated to a number of pulses counted on the MS_COM line. After each one of the retract stages, the device executing the stage will generate a respective pulse on the MS_COM line. As already discussed, the wait time for the devices can be implemented with a Low_On brake (turn on of the Low Side of the VCM Full H Bridge). In order to avoid unexpected long waiting times related to communication issues, each device can be assigned a dedicated time out that will not allow waiting for an undefined time; also, an internal clock is available for each of the devices to allow recovery also in the case the MS_CLK is lost.

For the purpose of startup synchronization, assignment of master (M) or slave (here, SA, SB, Sc) status can occur, e.g., as a firmware decision at system startup with a certain serial command. This command can be generated, in a manner known per se to those of skill in the art.

Managing plural VCMs during normal operation (write/read during "power good" times) can be accomplished via an associated System on Chip (SoC)—not visible in the figures.

In a possible embodiment, via that SoC, the user will first identify all the slaves (in the example considered here SA, SB, Sc) and, as soon as identified, the slaves will be set to a waiting state.

In response to "addressing" the slaves SA, SB, Sc the user will also identify the master M.

As soon as the master M is identified, the associated device will generate a dedicated clock signal on the MS_CLK line and a pattern on the MS_COM line that will mark a "zero" time slot Slot 0 in respect of all the slaves SA, SB, and Sc. This "zero" time Slot 0 is captured on the line MS_COM and recorded (memorized) by the slaves SA, SB, Sc (previously set in a waiting mode). As soon as the "zero" time slot Slot 0 is identified for all the devices, each device connected to the communication line MS_COM (each of the slaves SA, SB, Sc, and also the master M) will generate signals only in a dedicated time slot.

FIG. 4 exemplifies how the master unit M can synchronize its slot location to the other slaves (SA, SB, Sc, in the example considered here). For simplicity and ease of explanation, FIGS. 4 to 8 discussed in the following will refer to a system 100 assumed to be composed of a master device M and (only) one slave device, namely SA: it will be otherwise appreciated that the disclosure provided for that one slave device can apply to any number of slave devices (here, merely by way of non-limiting example, SA, SB, and Sc).

Specifically, FIG. 4 shows how the master device assigns a slot (e.g., Slot 1) to each slave device (e.g., device SA) starting from a point of time SA identified by an event EM generated by the master unit M.

This type of slot definition, based on the clock signal MS_CLK, facilitates all the devices (whatever their number) in having a dedicated time slot (e.g., Slot 0 for the master unit M, Slot 1 for a first slave unit SA, Slot 2 for a second slave unit SB, Slot 3 for a third slave unit Sc, and so on other dedicated slots—not visible for simplicity—for the other possible slave devices). This facilitates operation of the units M (master) and SA, SB, Sc (slaves) in a timed relationship synchronized by the clock signal on the line MS_CLK in a timed relationship, with the capability of avoiding undesired mutual overlapping.

The situation shown in FIG. 5 again refers for simplicity to a system 100 assumed to be composed of a master device M and (only) one slave device SA, this latter being again assumed to be exemplary of one of any number of slave devices. Here the master unit M is associated to a "zero" slot Slot 0, and the slave unit SA is associated to the Slot 1.

Assuming both the master unit M and the slave unit SA have a simultaneous event (e.g., VCM brake or park stage started or completed) that they desire to communicate on the MS_COM line, a multi-VCM synchronization protocol as implemented in the system 100 herein is able to manage these events and avoid an undesired overlapping.

As illustrated in FIG. 5, this may involve generating two separated pulses EM (master event) and ES (slave event) on the line MS_COM so that a synchronization event SE will not generate a synchronization pulse SP on the line MS_COM. Advantageously, in a system 100 as exemplified herein, each device connected via the multi-VCM synchronization protocol implemented thereby has two sets of settings that can be selected.

A first setting is a total slot number: this is the total number of slots used for system operation, with the indication of a specific slot in the case of a slave device such as SA, SB, Sc. This information facilitates each device in identifying a respective slot of time to be used for communication over the line MS_COM.

A second setting is a timer selection for each retract stage: this is the setting that specifies the overall retract sequence. Each device in the system will be able to count a number of pulses on the MS_COM line, and in response to the pulse count matching (e.g., reaching) a respective stage timer, the device can start the retract stage related to the timer selected. Using timer selection for each retract stage provides extensive flexibility in controlling the retract stages across all the VCMs (here, VCM1 to VMC4).

Flexibility may become particularly evident for a number of "signature points" of a system 100 as disclosed herein.

Specific slot start: this represents a sort of standard behavior, with a retract stage started in response to a correct number of pulses on the MS_COM line being reached. The specific time slot for a certain device is set by a serial port and selectable as a function of user specifications.

Immediate start: in case the retract stage is desired to be started immediately, the timer can be set to 0 (or a lower number compared to the previous stage), this will allow no waiting for the counter to start the stage.

Simultaneous start: simultaneous retract stages are also allowed in a system as exemplified herein; if two devices present an equal timer number and assuming that all the previous retract stages are completed, the two devices with the same timer value will start the retract stage simultaneously.

Waiting time: as discussed previously, retract stages can be executed immediately or have the possibility of "waiting" a more favorable time for starting. During such a "waiting time", any of the VCMs can be kept in a condition that can be termed as a short brake. For instance, the low side FETs of the H-Bridge driving the VCM can be turned on (made conductive) keeping the VCM on a brake condition, reducing in passive way any possible residual movement.

By way of explanation of a possible retract sequence in a system 100 as exemplified herein, when a retract is performed, the system (the master unit M, for instance) generates a pulse on the MS_COM line; this pulse will communicate to all the other devices (namely SA, SB and Sc) coupled to the line MS_COM that a retract phase has started (e.g., at time RS).

At this point, each of the devices will implement its own sequence and perform the retract stages (Brake, TPark 1 and TPark 2) at times (order of stages among the devices) that can be selected by the user.

Figure 6:
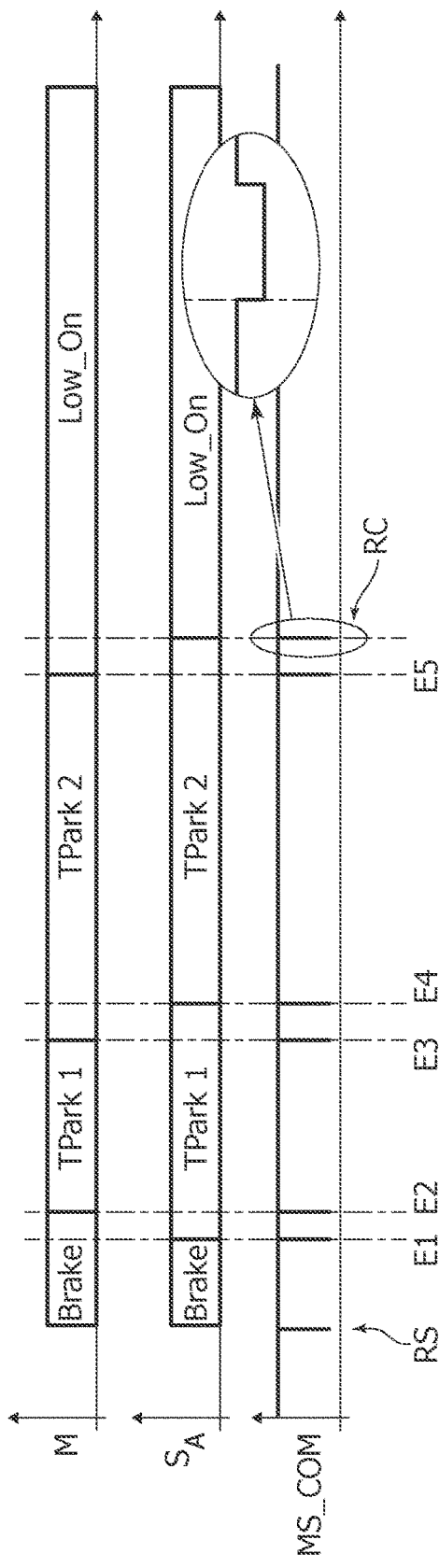
FIG. 6 is illustrative of unsynchronized retract operation in a system as discussed herein.

FIG. 6 once more refers by way of simplicity to a system 100 comprising two devices, a master unit M and a slave unit (e.g., the unit SA, this latter being again assumed to be exemplary of one of any number of slave devices).

In the exemplary case of FIG. 6, retract starts at the generation of a first retract start pulse RS and both devices execute an immediate retract. Possible timer values that can be associated to the two devices (one master M, one slave SA) in this case are reported in Table I below.

TABLE I

Immediate Retract-Timer Settings

| Retract stage | Timer for master | Timer for Slave |
|---|---|---|
| Brake | 0 | 0 |
| TPark 1 | 0 | 0 |
| TPark 2 | 0 | 0 |

In the exemplary case of FIG. 6, the devices M and SA do not wait for any of the stages to end; the retract stages are executed immediately and simultaneously, with the following events communicated after retract start RS with pulsed signals sent over the communication line MS_COM, e.g.:

E1=slave brake completed and slave TPark 1 started
E2=master brake completed and master TPark 1 started
E3=master TPark 1 completed and master TPark 2 started
E4=slave TPark 1 completed and slave TPark 2 started
E5=master TPark 2 completed; master set to Low_On
RC=slave TPark 2 completed; slave set to Low_On>>>retract completed at time RC.

Figure 7:
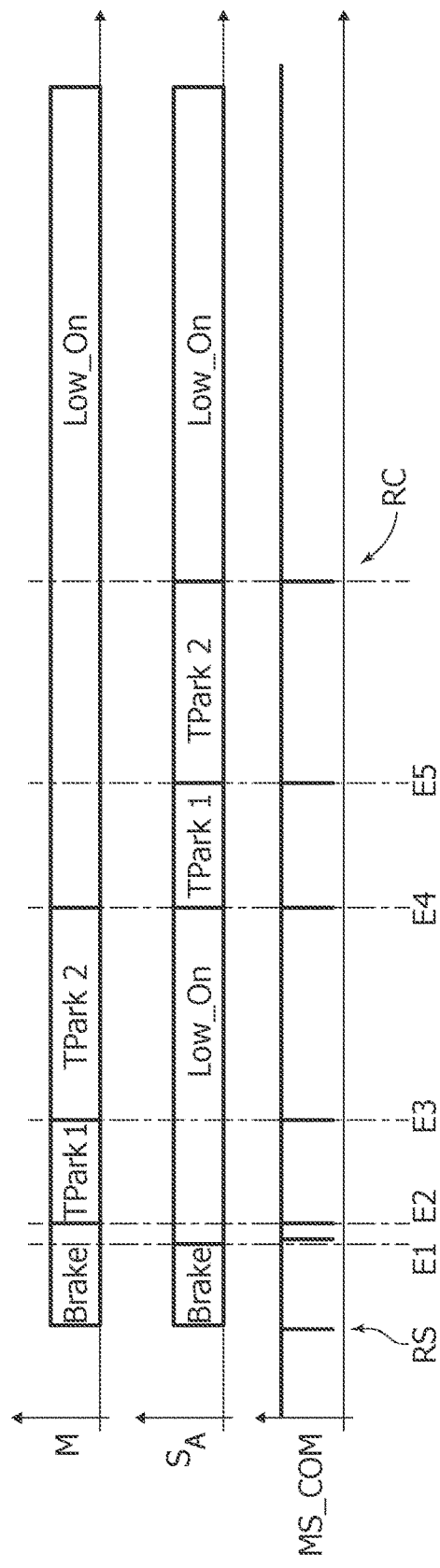
FIG. 7 is illustrative of immediate brake operation followed by staggered master-slave execution of park stages in a system as discussed herein.

Proceeding with the example, FIG. 7 shows a couple of timelines to highlight the synchronization and the flexibility of the system.

FIG. 7 again refers by way of simplicity to a system 100 comprising two devices, a master unit M and a slave unit (e.g., the unit SA, this latter being once more assumed to be exemplary of one of any number of slave devices). The case presented in FIG. 7 is exemplary of simultaneous brake chosen to be executed, with completion of retract stages only in response to brake stages being completed both in the master device/unit M and in the slave device/unit SA. Moreover, the case presented in FIG. 7 is exemplary of retract started at time RS and being executed for the master unit M with the slave following (only) in response to the master retract being (fully) completed.

Possible timer selections used to obtain this manner of operation are reported on Table II below.

TABLE II

Immediate Brake-Execute master and after slave-Timer Settings

| Retract stage | Timer for master | Timer for Slave |
|---|---|---|
| Brake | 0 | 0 |
| TPark 1 | 2 | 4 |
| TPark 2 | 0 | 4 |

In the case exemplified in FIG. 7, the following events are communicated after retract start RS with pulsed signals sent over the communication line MS_COM, e.g.:

E1=slave brake completed and slave set to Low_On
E2=master brake completed and master TPark 1 started
E3=master TPark 1 completed and master TPark 2 started
E4=master TPark 2 completed; master set to Low_On and slave TPark 1 started
E5=slave TPark 1 completed and slave TPark 2 started
RC=slave TPark 2 completed; slave set to Low_On>>>retract completed at time RC.

FIG. 8 again refers by way of simplicity to a system 100 comprising two devices, a master unit M and a slave unit (e.g., unit SA, this latter being as in the previous examples assumed to be exemplary of one of any number of slave devices).

Figure 8:
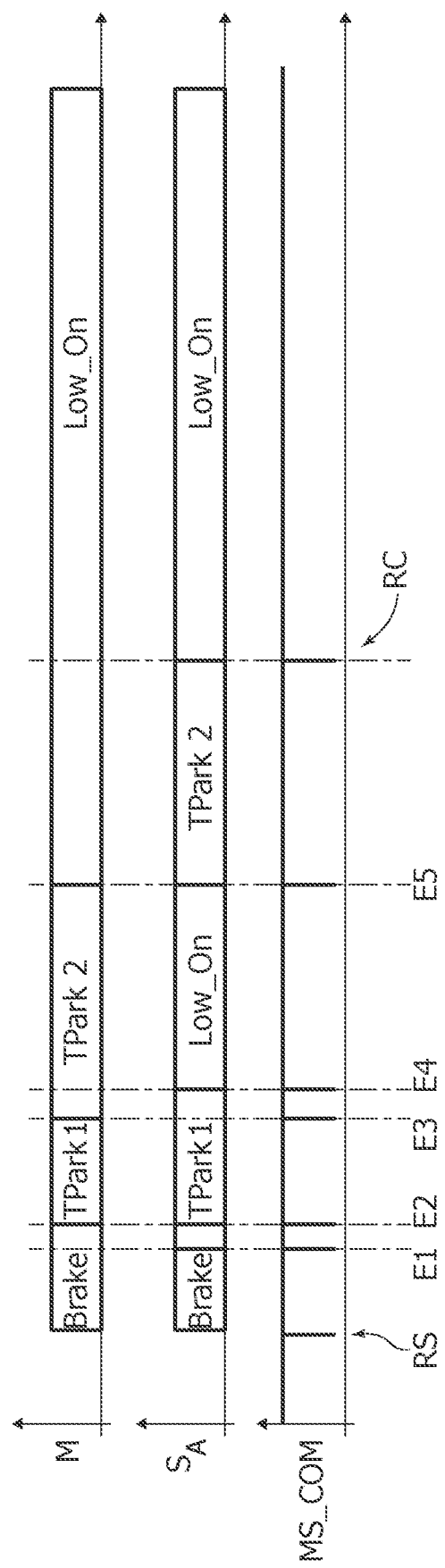
FIG. 8 is illustrative of overlapped execution of brake and first park stages followed by non-overlapped execution of second park stages in a system as discussed herein.

The exemplary case presented in FIG. 8 involves simultaneous brake stages in both the master unit M and the slave unit SA and TPark 1 started in both the master unit M and the slave unit SA in response to both brake stages being completed.

In the exemplary case presented in FIG. 8 the master unit executes the TPark 2 stage immediately after completed the TPark 1 stage, while the slave unit waits for completion of the whole retract by the master unit M before starting its TPark 2 stage.

Timer settings that can be used in a case as exemplifies in FIG. 8 are reported in Table III below.

TABLE III

Brake and TPark 1 overlapped-TPark 2 non-overlapped-Timer Settings

| Retract stage | Timer for master | Timer for Slave |
|---|---|---|
| Brake | 0 | 0 |
| TPark 1 | 2 | 2 |
| TPark 2 | 0 | 5 |

In the case exemplified in FIG. 8, the following events are communicated after retract start RS with pulsed signals sent over the communication line MS_COM, e.g.:

E1=slave brake completed and slave set to Low_On
E2=master brake completed; master TPark 1 started; slave TPark 1 started
E3=master TPark 1 completed and master TPark 2 started
E4=slave TPark 1 completed; slave set to Low_On
E5=master TPark 2 completed; master set to Low_On; slave TPark 2 started
RC=slave TPark 2 completed; slave set to Low_On>>>retract completed at time RC.

As noted, FIGS. 4 to 8 discussed in the foregoing refer for simplicity and ease of explanation to a system 100 assumed to be composed of a master device M and (only) one slave device SA, assumed to be exemplary of one of any number of slave devices.

In the case of a system comprising plural slave units, e.g., SA, SB, Sc, . . . and so on, the various contingencies/modes of operation may occur in various possible combinations, which lend themselves to being managed as discussed in the foregoing. Additionally, it is noted that retract started at the master unit M, while advantageous (e.g., for possible facilitated co-ordination with spindle control and BEMF rectification) is not per se strictly mandatory.

A system as exemplified herein provides in fact a high degree of flexibility insofar as retract can be initiated by any of the devices connected (by the master or any one of the slaves); also, the number of slaves can be increased or decreased in view of the application envisaged and the ordered sequence of the devices (master and slaves) can be manage freely according to the application need. FIGS. 4 to 8 are thus exemplary of just a part of the options available.

FIGS. 6, 7 and 8 are exemplary of arrangements wherein plural voice coil motors, VCMs such as VCM1, VCM2, VCM3, VCM4 (e.g., VCM1, VCM2) in a hard disk drive 10 are coupled to respective control units such as M, SA, SB, Sc (e.g., M, SA) configured to drive retract operation of the plural VCMs in the hard disk drive 10.

As discussed, retract operation of the VCMs comprises a sequence of retract steps, namely Brake, TPark 1, TPark 2, and the control units M, SA, SB, Scare coupled via a common clock line MS_CLK and a communication line MS_CLK. Master status is assigned to one of the control units, namely M, that applies a clock signal to the common clock line MS_CLK.

The control units M, SA, SB, Sc coupled via the common clock line MS_CLK thus all clocked by (and thus synchronized to) the clock signal applied to the common clock line MS_CLK.

As exemplified in FIGS. 4 and 5, each one of the control units M, SA, SB, Sc is assigned respective time slots (e.g., Slot 0, Slot 1) for communication over the communication line MS_CLK. In that way the respective time slots (such as, e.g., Slot 0 or Slot 1) are synchronized by the clock signal applied to the common clock line MS_CLK.

As exemplified, e.g., in FIGS. 6 to 8, in response to a first one of the control units (the master unit M, for instance) driving a first sequence of retract steps Brake, TPark 1, TPark 2 in a first one of the VCMs in the hard disk drive 10, e.g., VCM1: the first control unit (here, M) communicates over the communication line MS_CLK at its respective time slots (here, Slot 0) signals indicative of the first sequence of retract steps Brake, TPark 1, TPark 2 being performed at a first one of the VCMs (here, VCM1) in the hard disk drive 10; and a second one of the control units (here, SA) senses over the communication line MS_CLK the (pulsed) signals indicative of the first sequence of retract steps being performed at a first VCM (here, VCM1) and drives a second sequence of retract steps Brake, TPark 1, TPark 2 in a second one (here, e.g., VCM2, controlled by the unit SA) of the VCMs in the hard disk drive 10, so that the second sequence of retract steps is performed at the second VCM (here, VCM2) in a timed relationship to the first sequence of retract steps performed at the first VCM (here VCM1).

FIGS. 6 to 8 are exemplary of the flexibility provided by a system/protocol as presented herein in terms of the possibility of performing the second sequence of retract steps Brake, TPark 1, TPark 2 at the second VCM (namely, VCM2), selectively, for example, in an (at least partly) overlapped manner in time with the first sequence of retract steps Brake, TPark 1, TPark 2 performed at the first VMC (here VCM1). This is exemplified, for example, with respect to all of the retract steps Brake, TPark 1 and TPark 2 in FIG. 6, the braking steps Brake in FIG. 7 or the braking steps Brake plus the park step TPark 1 in FIG. 8. The second sequence of retract steps may also be performed selectively in an (at least partly) non-overlapped manner in time with the first sequence of retract steps Brake, TPark 1, TPark 2 performed at the first VMC (here VCM1), which is exemplified, for instance, with respect to park steps TPark 1 and TPark 2 in FIG. 7 and the park steps TPark 2 in FIG. 8.

The solution described herein may facilitate achieving a high degree of flexibility in implementing such a timed relationship. For instance, FIG. 6 is exemplary of a situation where the timed relationship comprises the second sequence of retract steps Brake, TPark 1, TPark 2 being performed at the second VCM (VCM2, controlled by the unit SA) simultaneously (that is, overlapping in time) with the first sequence of retract steps Brake, TPark 1, TPark 2 performed at the first VCM (VCM1, controlled by the unit M).

More specifically, FIG. 6 is exemplary of a situation where the retract operation of the VCMs comprises a sequence of a braking step Brake and at least one park step (e.g., two park steps, Park 1, TPark 2) and the timed relationship comprises the braking step Brake and the at least one park step Park 1, TPark 2 performed simultaneously (in a time overlapping manner): in the second sequence of retract steps Brake, Park 1, TPark 2 performed at the second VCM, namely VCM; and in the first sequence of retract steps Brake, Park 1, TPark 2 performed at the first VCM, namely VCM1.

FIGS. 7 and 8 are exemplary of situations where retract operation of the VCMs again comprises a sequence of a braking step Brake and at least one park step Park 1, TPark 2, wherein the timed relationship comprises at least one of the braking step and at least one park step (here TPark 1 and/or TPark 2) in the second sequence of retract steps Brake, Park 1, TPark 2 performed at the second VCM, namely VCM2, in an (at least partially) non-overlapped time relationship to at least one of the braking step Brake and at least one park step TPark 1, TPark 2 in the first sequence of retract steps Brake, Park 1, TPark 2 performed at the first VCM, namely VCM1.

Specifically, in FIG. 7 the timed relationship between retract sequences comprises: the braking step Brake being performed simultaneously (in a time-overlapped manner, over at least a portion of the braking stage) in the second sequence of retract steps Brake, Park 1, TPark 2 performed at the second VCM (here VCM2) and in the first sequence of retract steps Brake, Park 1, TPark 2 performed at the first VCM (namely VCM1); and the at least one park step (namely Park 1, TPark 2) in the second sequence of retract steps performed (in a wholly non-overlapped manner) at the second one VCM (namely VCM2) after completing the first sequence of retract steps performed at the first VCM, namely VCM1.

In the exemplary case presented in FIG. 8 the sequence of retract steps again comprises a braking step Brake, followed by a pair of park steps Park 1, TPark 2 and the timed relationship between retract sequences comprises: the braking step Brake being performed simultaneously (with at least partial time overlap) in the second sequence of retract steps Brake, Park 1, TPark 2 performed at the second VCM (namely, VCM2) and in the first sequence of retract steps Brake, Park 1, TPark 2 performed at the first VCM (namely VCM1); and the pair of park steps (Park 1, TPark 2) being performed in an interleaved manner in the second sequence of retract steps Brake, Park 1, TPark 2 performed at the second VCM (here, VCM2) and in the first sequence of retract steps Brake, Park 1, TPark 2 performed at the first VCM (here VCM1).

It will be noted that in FIG. 8 the TPark 2 step in the "master" VCM, namely VCM1, is mostly performed in a non-overlapped manner while the "slave" VCM, namely VCM2, is at the Low_On state while the TPark 2 step in the "slave" VCM, namely VCM2, is mostly performed in an entirely non-overlapped manner while the "master" VCM, namely VCM1, is at the Low_On state, with the TPark 2 step performed in a interleaved manner in the two VCMs involved, namely VCM1 and VCM2.

As discussed, retract is a critical phase in HDD operation. Inadequate retract performance may create a failure likely to compromise the HDD functionality.

It is noted that retract stages can be undesirably "stuck" in waiting in at least two ways: a wrong timer being mistakenly chosen and a problem occurring at the PCB level so that communication of the MS_COM line is missing.

A system as described herein can address both these issues.

In the first place, a time out can be provided for each and every retract stage. If a specific stage results in a "waiting time" state for longer than a certain time out, the next stage can automatically kick-in. Also, at the end of a timed-out stage, no signal is generated on the MS_COM line.

A protocol as implemented in the exemplary system described herein is capable of effectively performing retract even if a wrong time is chosen for the retract stages or in case communication over the MS_COM line is lost: if a retract section is started with a time out, the MS_COM pulse that is generated after the end of a stage completion is no longer generated. As noted, the time out value is not fixed, but it is selectable independently for each device.

In fact, even in the presence of a wrong timer setting and/or retract forced to run at time out (so that no MS_COM pulsed are generated) both the master and the slave device(s) can complete retract following the selected time out. This may be, by way of example, the case of a time out selected for the master M at 500 ms, with a time out selected for the slave being 150 ms. Of course, these figures are merely exemplary and non-limitative of the embodiments. This time out can be made user-selectable and can be different for each device.

As noted, voltage to energize a system such as the system 100 during retract can be generated by exploiting the (rectified) BEMF of the spindle motor. This voltage is found to be frequently associated with a fairly high series resistance. Considering that all the devices M, SA, SB, Sc in a system such as the system 100 are synchronized with a same clock signal MS_CLK, a protocol as implemented in the system 100 may also facilitate "dis overlapping" the active times Ton of VCM drivers for all the Brake TPark 1 or TPark 2 steps.

It is noted that, since all the devices in the system 100 are clocked by clock signals synchronized with MS_CLK, the multi-VCM synchronization protocol implemented by the system 100 also facilitates shifting over time the active time Ton of the PWM signals use to drive the VCMs, thus avoiding simultaneous active times. This was found to reduce the drop induced on the voltage generated starting from the spindle motor BEMF.

Due to the sharing of the MS_CLK signal, a same setup can be used also to "disoverlap" the PWM drive of the various VCMs. In fact, avoiding simultaneous active times is advantageous as this can "spread" over time current pulses that would otherwise produce a cumulative current peak over a short time.

Figure 9:
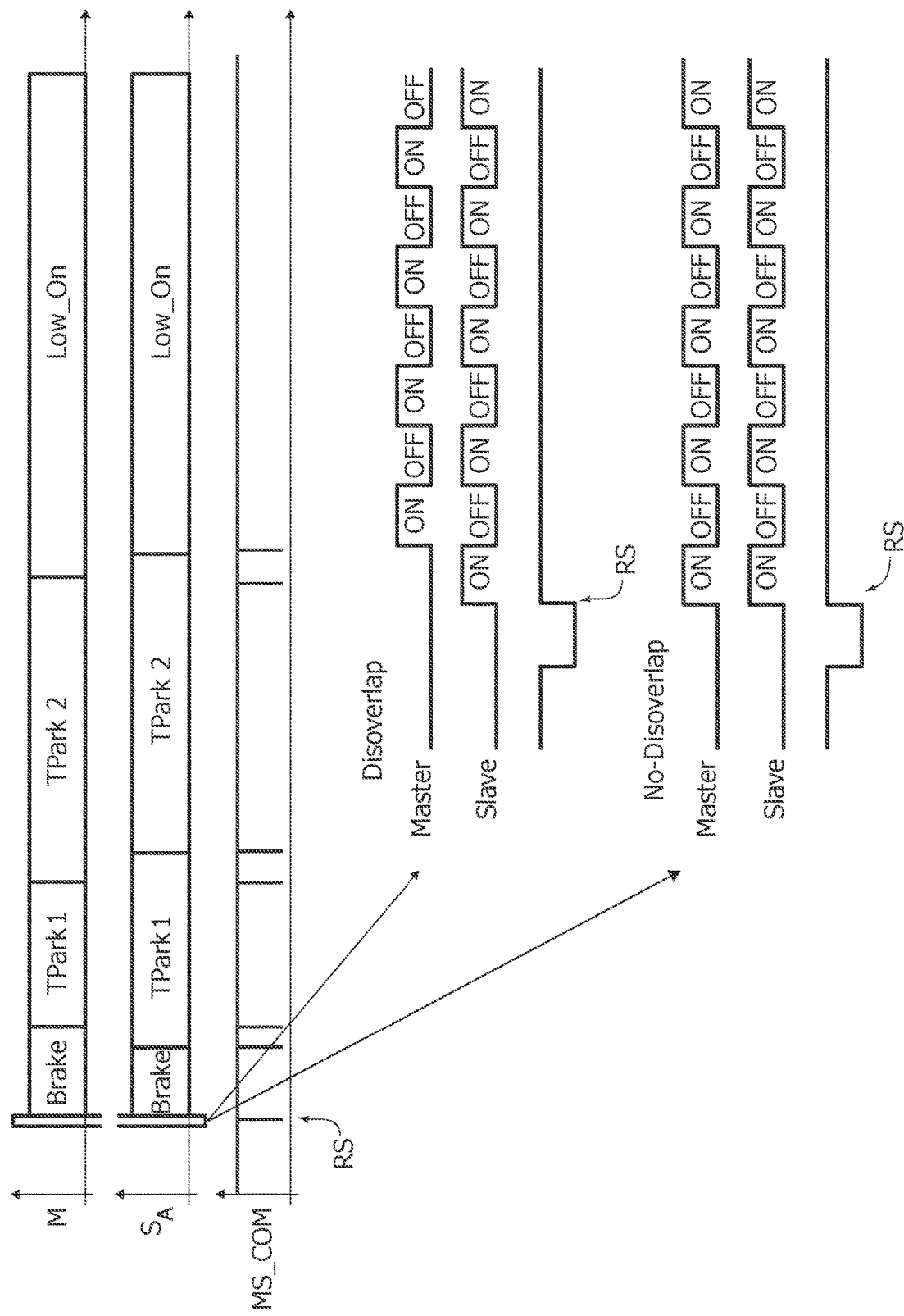
FIG. 9 is further illustrative of possible operation in a system as discussed herein contrasting disoverlap and non-disoverlap modes.

A simplified comparison of a "disoverlap" feature vs. a "no-disoverlap" feature is presented in FIG. 9. Specifically FIG. 9 shows a retract started (at RS) considering—by way of example—a 50% duty cycle for both master M and slave SA. This approach can be notionally extended to a different number of devices and different values for the duty cycle.

As discussed, in "power down" retract, the voltage used to energize the retract stages is generated starting from the BEMF of the spindle motor, that may have a high serial resistance (on the range of a few Ohms, e.g., 2 or 3 Ohm).

A dis-overlap operation as discussed previously can reduce the overall voltage drop, or at least reduce its duration in time (taking into account the capacitance used to "sustain" the rectified voltage drawn from the motor).

Advantageously, as noted, in a multi-VCM synchronization protocol as implemented in a system such as the system 100 herein: each device (e.g., VCM1, VCM2, VCM3, VCM4) can follow a specific sequence of retract stages, in order: Brake, TPark 1 and TPark 2; each retract stage can be either executed immediately or wait for a specific time as determined by a counter associated to the number of pulses counted on the MS_COM line (after each retract stages the device executing the stage can generate a pulse on the MS_COM line); the wait time on each device can be implemented with a Low ON Brake (turn on of the low side of the VCM Full H Bridge—as otherwise conventional in single-VCM systems); to prevent unexpected long waiting times or communication issues, each device in the system can have a dedicated time out so that the device will not be kept in wait indefinitely; and an internal clock is available for each device to allow recovery also if communication over the MS_CLK line is lost.

Figure 10:
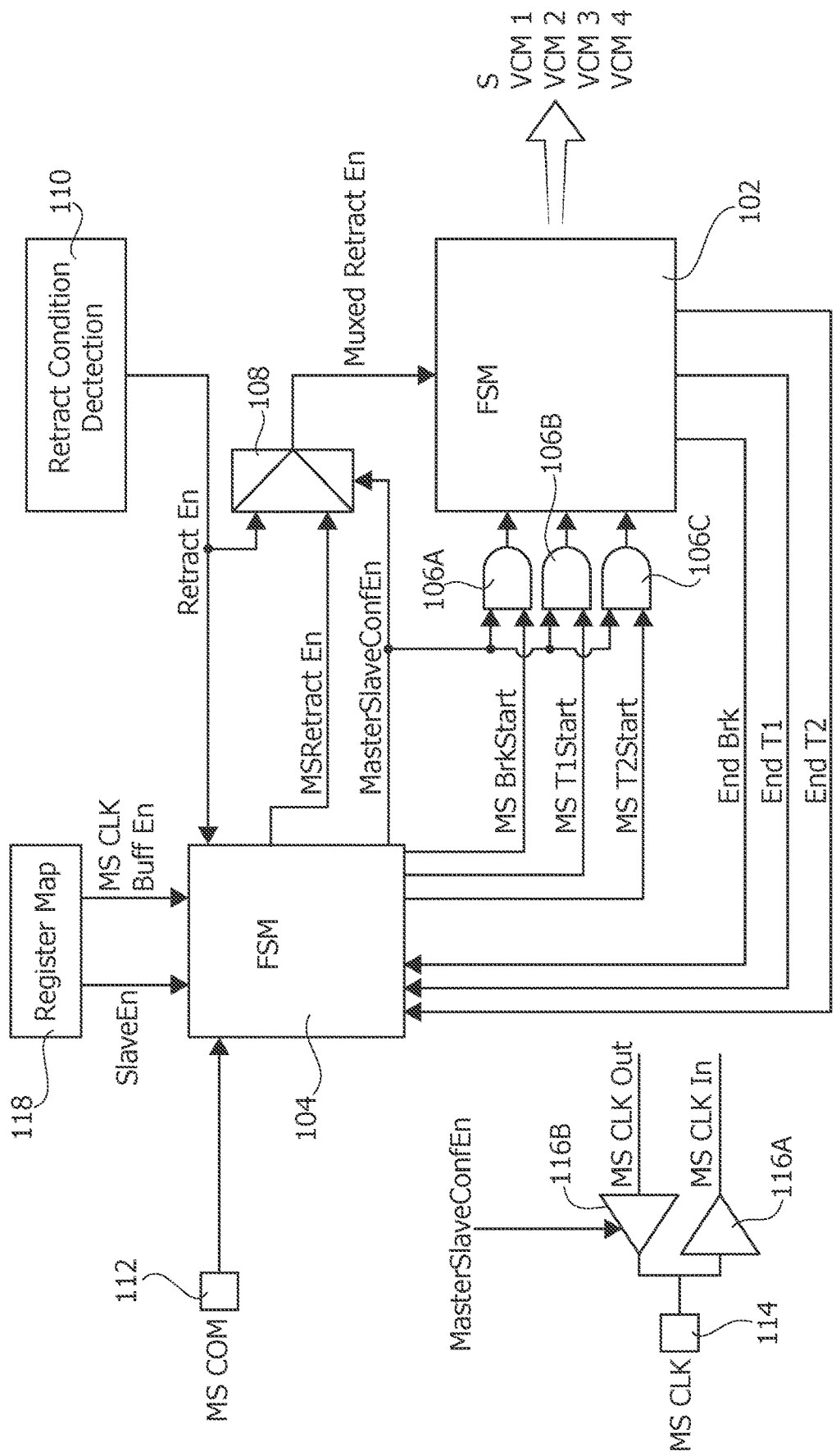
FIG. 10 is a block diagram of a possible circuit arrangement for implementing a multi-VCM synchronization protocol in a system as discussed herein.

FIG. 10 is a block diagram of a possible circuit configuration of any of the units M, SA, SB and Sc for implementing a multi-VCM synchronization protocol as discussed herein.

As noted, each device, e.g., VCM1, VCM2, VCM3, VCM4, is assumed to follow a specific sequence of retract stages, namely (as otherwise conventional in the art in the case of a single-VCM hard disk drive): Brake, TPark 1 and TPark 2.

In a system as illustrated in FIG. 10, operation of the VCMs, namely VCM1 to VCM4 is controlled—in a manner known per se to those of skill in the art (e.g., via a PWM drive signal)—via a finite state machine (FSM) 102 provided for each of the units (either master M or slaves SA, SB and Sc).

Each FSM 102 receives Brake, TPark 1 and TPark 2 start signals, namely MS_BrkStart, MS_T1Start, MS_T2Start for the unit via a second finite state machine (FSM) 104 that manages MS COM control and monitoring functions.

The signals MS_BrkStart, MS_T1Start, MS_T2Start are subject to gating pending the "presence" of other devices. Gating is performed with AND gates 106A, 106B, and 106C via an enable signal MasterSlaveConfEn likewise produced by the MS control FSM 104 (this signal is indicative of the presence of other units).

As illustrated in FIG. 10, the FSM 102 returns Brake, TPark 1 and TPark 2 end signals, namely End_Brk, End_T1, and End_T2 to the FSM 104. These are intended to become shared (via the FSM 104) during respective time slots over the line MS_COM so that the other devices in the system 100 may become "aware" of the retract stage being completed by the device issuing those signals.

A multiplexer 108 controlled by the MasterSlaveConfEn signal produced by the FSM 104 applies to the FSM 102 a Muxed Retract En signal (enabling retract operation of the FSM 102) as either one of: a first retract enable signal Retract En for the FSM 102 that is not conditioned by the presence of other devices, making the unit work as standalone device; or a second retract enable signal MSRetract En that is managed by the FSM 104 and therefore will take into account the presence of on-going retract operation and respective settings.

The first enable signal Retract En is generally indicative of retract operation being contemplated for the HDD for any of a set of possible reasons (e.g., onset of a power down condition being detected at the retract condition detection block or feature 110.

As discussed in the foregoing (see, e.g., FIGS. 4 to 8) operation of the FSM 104 is under the control of signals provided on the communication line MS_COM at a node 112.

The clock line MS_CLK at a node 114 supports a clock signal that is configured: to be supplied to the system 100 via a buffer stage 116A as an input clock signal MS_CLK In (generated in a manner known per se to those of skill in the art); or to be received via a buffer stage 116B as an output clock signal MS_CLK Out from the system 100 (master M) under the control of the MasterSlaveConfEn signal.

The MasterSlaveConfEn signal is generated as a function of two signals SlaveEn and MS_CLK Buff En stored as a register map 118 (these are also supplied to the FSM 104) according to the following truth table (Table IV).

TABLE IV

MasterSlaveConfEn signal generation

| SlaveEn | MS_CLK Buff En | MasterSlaveConfEn |
|---------|----------------|-------------------|
| 0 | 0 | 0 |
| 0 | 1 | 1 (Master) |
| 1 | 0 | 1 (Slave) |
| 1 | 1 | 0 |

Without prejudice to the underlying principles, the details and embodiments may vary, even significantly, with respect to what has been described in the foregoing, by way of example only, without departing from the extent of protection.

What is claimed is:

1. A method, comprising:
   sensing, by a first voice coil motor (VCM) control circuit over a communication line configured to be coupled to a second VCM control circuit, signals indicative of a first sequence of retract steps being performed by a second VCM coupled to the second VCM control circuit;
   applying a clock signal on a common clock line, or receiving the clock signal on the common clock line, wherein the common clock line is different from the communication line; and
   driving, by the first VCM control circuit, a second sequence of retract steps, wherein the second sequence of retract steps is performed at a first VCM in a timed relationship to the first sequence of retract steps performed at the second VCM, and the timed relationship is synchronized with the clock signal.

2. The method of claim 1, further comprising applying the clock signal to the common clock line in response to the first VCM control circuit being assigned a master status.

3. The method of claim 2, further comprising controlling a spindle motor by the first VCM control circuit.

4. The method of claim 1, further comprising receiving the clock signal from the common clock line in response to the first VCM control circuit being assigned a slave status.

5. The method of claim 1, wherein the second sequence of retract steps overlaps in time with the first sequence of retract steps.

6. The method of claim 1, wherein the second sequence of retract steps does not overlap in time with the first sequence of retract steps.

7. The method of claim 1, wherein the second sequence of retract steps comprises at least one braking step and at least one park step.

8. The method of claim 1, further comprising:
   receiving a timer signal via the communication line; and
   delaying, by the first VCM control circuit, the second sequence of retract steps based on the timer signal.

9. The method of claim 8, wherein delaying the second sequence of retract steps comprises limiting a maximum delay to a time-out value.

10. A first voice coil motor (VCM) control circuit, comprising:
    a first finite state machine (FSM) configured to be coupled to a second VCM control circuit over a communication line, the first FSM configured to sense signals indicative of a first sequence of retract steps performed at a second VCM over the communication line;
    a second FSM coupled to the first FSM and having outputs configured to be coupled to the first VCM at a drive output, the second FSM configured to drive a second sequence of retract steps at the drive output, wherein the second sequence of retract steps is performed in a timed relationship to the first sequence of retract steps performed at the second VCM; and
    a clock interface circuit configured to be coupled to a clock line that is coupled to the second VCM control circuit.

11. The first VCM control circuit of claim 10, wherein the clock interface circuit is configured to:
    transmit an output clock signal in response to receiving a signal indicating that the first VCM control circuit is in a master mode, and
    receive an input clock signal in response to receiving a signal indicating that the first VCM control circuit is in a slave mode.

12. The first VCM control circuit of claim 10, wherein the second FSM is configured to cause the second sequence of retract steps to overlap in time with the first sequence of retract steps.

13. The first VCM control circuit of claim 10, wherein the second FSM is configured to cause the second sequence of retract steps to not overlap in time with the first sequence of retract steps.

14. The first VCM control circuit of claim 10, wherein the second sequence of retract steps comprises at least one braking step and at least one park step.

15. The first VCM control circuit of claim 10, wherein
    the first FSM is configured to receive a timer signal from the communication line; and
    the second FSM is configured to delay the second sequence of retract steps based on the timer signal.

16. A method of operating a hard drive system, the method comprising:
    controlling, by a master control circuit, a spindle motor of the hard drive system;
    generating, by the master control circuit, a back-electromotive force (BEMF) from the spindle motor;
    providing power generated from the BEMF to a slave control circuit coupled to the master control circuit, wherein the slave control circuit is coupled to a first VCM;
    applying, by the master control circuit, a clock signal on a common clock line coupled to the slave control circuit; and
    sensing, by the master control circuit over a communication line coupled to the slave control circuit, signals indicative of a first sequence of retract steps being performed by the first VCM, wherein the first sequence of retract steps is synchronized to the clock signal applied by the master control circuit.

17. The method of claim 16, further comprising:
    driving, by the master control circuit, a second sequence of retract steps, wherein the second sequence of retract steps is performed at a second VCM in a timed relationship to the first sequence of retract steps performed at the first VCM.

18. The method of claim 17, wherein the second sequence of retract steps is initiated prior to the first sequence of retract steps.

19. The method of claim 17, wherein the second sequence of retract steps overlaps in time with the first sequence of retract steps.

20. The method of claim 17, wherein the second sequence of retract steps is synchronized to the clock signal.

* * * * *